Figure 1:
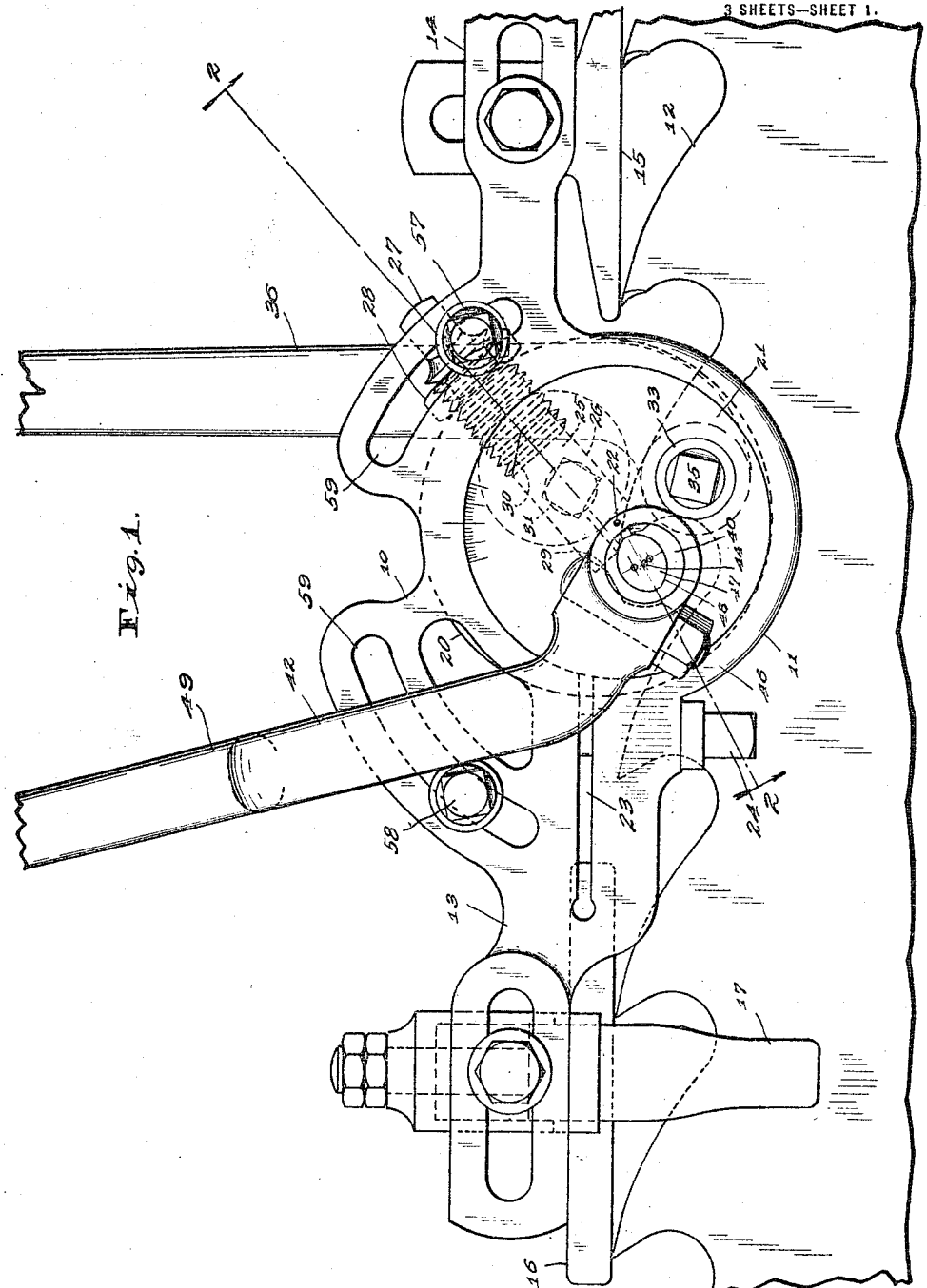

J. F. PRIBNOW.
SAW SWAGE.
APPLICATION FILED JUNE 21, 1918.

1,284,141.

Patented Nov. 5, 1918.
3 SHEETS—SHEET 1.

Witness
Frank A. Fahle

Inventor
John F. Pribnow,
By
Hood & Schley.
Attorneys.

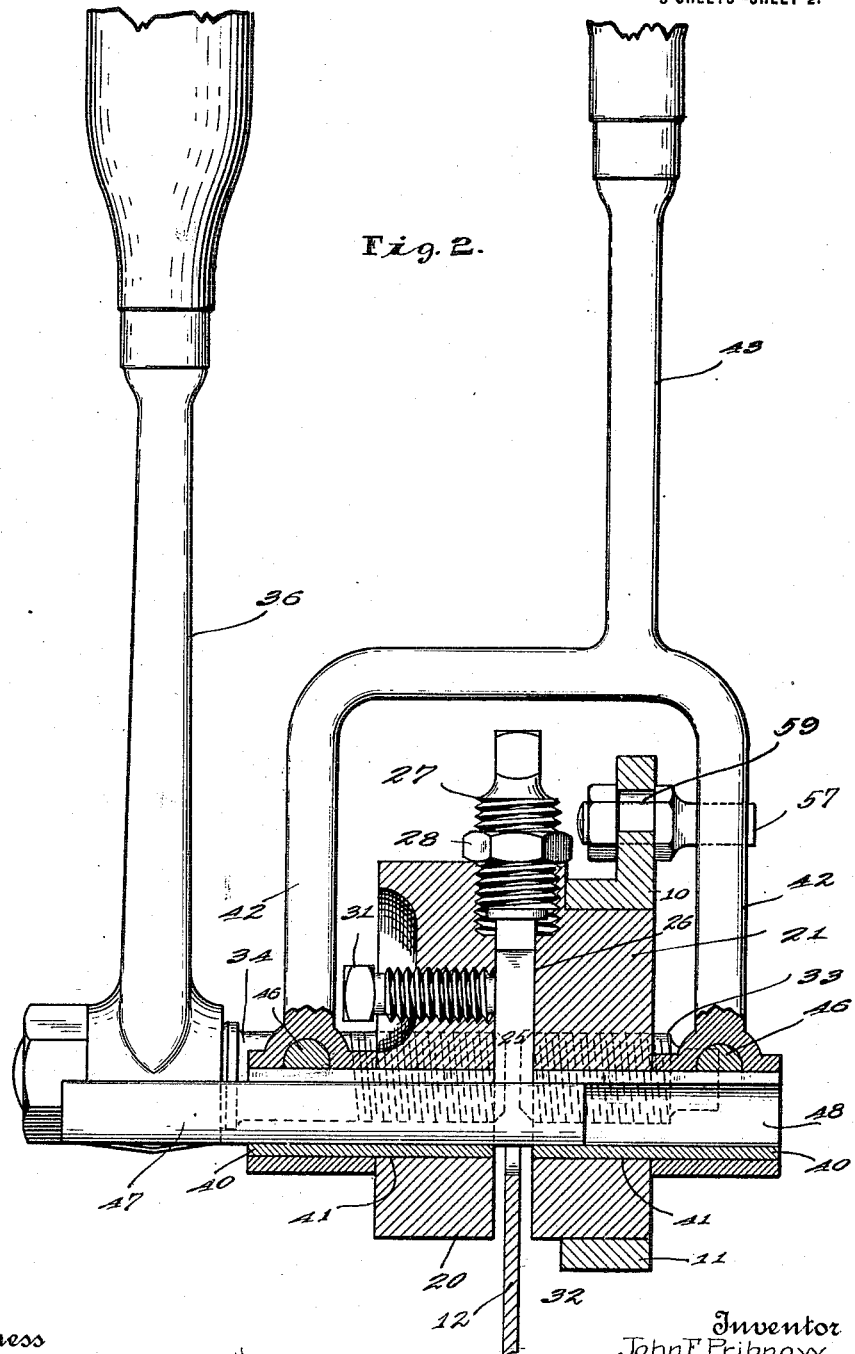

J. F. PRIBNOW.
SAW SWAGE.
APPLICATION FILED JUNE 21, 1918.
1,284,141.
Patented Nov. 5, 1918.
3 SHEETS—SHEET 3.
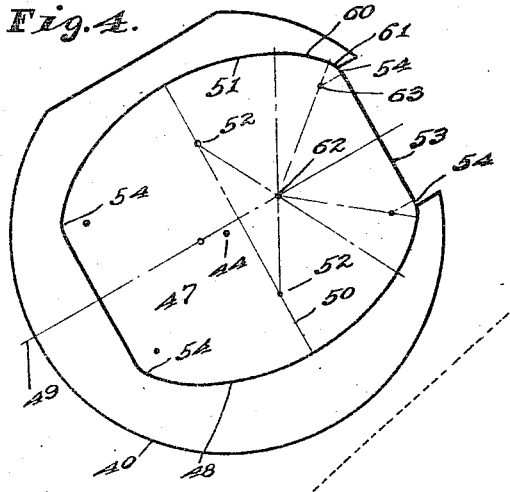
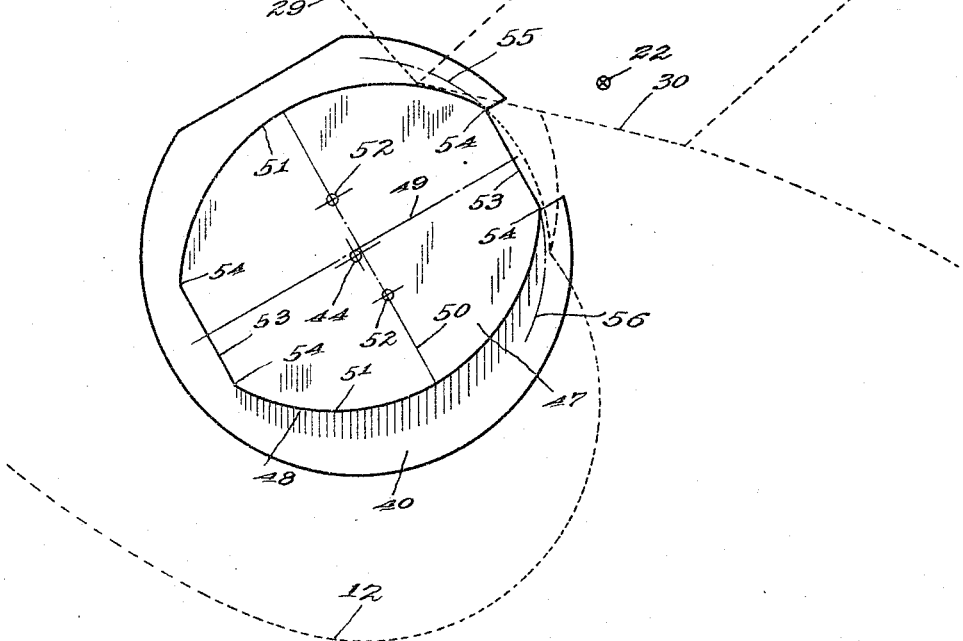
Witness
Frank A. Sable
Inventor
John F. Pribnow,
By
Hood & Schley.
Attorneys

UNITED STATES PATENT OFFICE.

JOHN F. PRIBNOW, OF MELLEN, WISCONSIN, ASSIGNOR TO E. C. ATKINS & COMPANY, OF INDIANAPOLIS, INDIANA, A CORPORATION OF INDIANA.

SAW-SWAGE.

1,284,141.   Specification of Letters Patent.   Patented Nov. 5, 1918.

Application filed June 21, 1918. Serial No. 241,168.

*To all whom it may concern:*

Be it known that I, JOHN F. PRIBNOW, a citizen of the United States, residing at Mellen, in the county of Ashland and State of Wisconsin, have invented new and useful Saw-Swages, of which the following is a specification.

It is the object of my invention to improve the operation of saw swages. More particularly, it is the object of my invention to construct and mount the swaging die so that it is of uniform cross section throughout and has four operating corners which may be used for substantially the entire length of the die; to make such die symmetrical about two axes, so that it is interchangeable to bring any of the four corners into working position; to mount the die in bushings so that in operation only the proper working face and corner will engage the saw tooth being swaged, and there will be no drag of any other face or corner on the saw tooth; and to mount the die and its bushings in a swage block which is adjustable circumferentially for different shapes of teeth and in which an improvement in the coöperation of the die with the saw tooth for different adjustments of the swage block is obtained, by having the center of adjustment of the swage block spaced very slightly outside the arc in which the working corner of the die moves when the swage is operated.

This present invention is in many respects an improvement and development of the saw swage shown in my Patent No. 1,176,985, granted March 28, 1916.

The accompanying drawings illustrate my invention. Figure 1 is a side elevation of a saw swage embodying my invention, with some parts broken away and in section to show the coöperation of the parts; Fig. 2 is a section on the line 2—2 of Fig. 1; Fig. 3 is an enlarged end elevation of the die and bushings, showing the relations of the various centers to one another; and Fig. 4 is a view similar to Fig. 3, showing a slightly modified form of die.

The frame 10 has a central annular portion 11 set to one side of the plane of the saw 12 to be swaged, and forwardly and rearwardly projecting portions 13 and 14. On the rearwardly projecting portion 14 is mounted a rear guide bar 15, which is adjustable both vertically and horizontally to conform to the particular saw being operated on. A horizontal guide bar 16 for engaging the tops of the teeth and a pair of side fingers 17 for engaging the sides of the saw in front of the tooth being operated on are adjustably mounted on the forwardly projecting portion 13.

A swage block 20 extending across the plane of the saw 12 has a cylindrical end 21, which fits within the annular portion 11 of the frame 10 and is circumferentially adjustable therein about the common center 22 of said cylindrical portion 21 and the inside cylindrical face of the annular portion 11. To permit this adjustment, the frame 10 has a longitudinal slot 23 projecting forwardly through the annular portion 11 and into the portion 13, and a clamping bolt 24 extends across this slot 23 so that by tightening and loosening such clamping bolt the annular portion 11 is made to grip or release the cylindrical portion 21 of the swage block. An anvil 25 is mounted in a nearly radial hole 26 in the swage block 20, and this anvil is adjustable by an adjusting screw 27 mounted in the outer end of the hole 26 and provided with a lock nut 28. By removing the screw 27, the anvil 25 may be withdrawn from the outer end of the hole 26. The anvil 25 is reversible end for end, so that either end may be the working end; and each end has one square face 29 for receiving the pressure of the screw 27 and one beveled face 30 for engaging the back face of a tooth being swaged. When the anvil 25 has been adjusted to proper position by the screw 27, it is clamped in such position by a clamping screw 31. The swage block 20 is bifurcated, so as to provide in its lower portion a slot 32 to receive the saw being swaged, and the working end of the anvil 25 projects into this slot 32. Two clamping screws 33 and 34 are mounted in the two axial ends of the swage block 20, and project into the slot 32 so as to engage the side faces of the saw at the base of the tooth being swaged and hold the saw in position for swaging. These screws 33 and 34 are similar to the saw-clamping screws shown in my aforesaid Patent No. 1,176,985, the screw 33 being provided with a square head 35 for adjusting it to any desired setting, and the screw 34 being provided with a clamping lever 36 whereby it may be operated quickly and conveniently to clamp the saw and release it.

Two longitudinally split bushings 40 are mounted in alined bushing holes 41 in the two axial ends of the swage block 20, and project from the slot 32 outward in opposite directions beyond the end faces of the swage block so as to have mounted thereon the two prongs 42 of a bifurcated operating lever 43, so that by the operation of said lever 43 the two bushings 40 are turned correspondingly. The holes 41 are cylindrical holes to permit this turning, having a center 44; and the bushings 40 are cylindrical exteriorly to fit rotatably within these holes 41, save that within its prong 42 each bushing has a flat face to coöperate with a clamping bolt 46 mounted in such prong. These clamping bolts are of the type shown in my aforesaid Patent No. 1,176,985, and are tightened or loosened to cause the split bushings 40 to grip or release the swaging die 47 mounted within such bushings and extending across the slot 32.

The die 47 is a straight bar of uniform cross section throughout, and is received in alined holes 48, corresponding to the die in shape and size of cross-section, extending longitudinally through the bushings 40. Thus the die 47 is supported on both sides of the slot 32, and by loosening the clamping bolts 46 may be adjusted longitudinally within said bushings to bring different portions of the die into working position in the slot 32. The die 47 is symmetrical in cross section about both a longitudinal or major axis 49 and a transverse or minor axis 50. It has two opposite cylindrical segments 51 each of which has its center 52 on the transverse axis 50 but on the opposite side of the major axis 49 from such segment, as is clear from Fig. 3. The cylindrical segments 51 do not extend to intersect each other; instead they either directly intersect plane faces 53 at the opposite ends of and perpendicular to the major axis 49, as is shown in Fig. 3, or approach close to such plane faces and are connected therewith by cylinder segments 60 and 61 of successively shorter radii having centers 62 and 63 respectively and tangent to each other and to both the adjacent cylindrical segments 51 and plane faces 53, as shown in Fig. 4. The centers 62 are conveniently on the major axis 49, and are common to two segments 60, as this facilitates manufacture. The plane faces 53 and the cylindrical segments 51 form four working corners 54, which may thus be either sharp as in Fig. 3 or rounded as in Fig. 4. By reversing the die 47 about the two axes 49 and 50, any one of these four working corners 54 may be brought into working position; and by shifting the die 47 longitudinally in the bushings, nearly the whole length of each working corner (excepting a very small portion at each end of the die) may be used for the swaging operation.

The shape of the holes 48 corresponds to that of the die 47. However, the holes 48 are not formed centrally in the bushings 40. Instead, they are so formed that the center 44 of the outside cylindrical surface of the bushings 40 and of the internal surface of the corresponding holes 41 in the swage block is not on either axis 49 or 50, but lies in the opposite quadrant formed by such axes from that in which the working corner 54 lies. Because of this, when the device is operated in the swaging operation, and the working corner 54—the upper right-hand one of the four corners 54 in Figs. 1, 3, and 4—is moved in a counter-clockwise direction so that it approaches the beveled working face 30 of the anvil 25, the immediately following corner 54—the lower right-hand corner—moves entirely within the arc traversed by the working corner 54 and so does not drag and wear on the front face of the saw tooth. That is, as is clear from Fig. 3, both the working corner 54 and the corner 54 which follows it move about the center 44 of the holes 41, but the working corner 54 moves on an arc 55 of larger radius than the arc 56 on which the following corner 54 moves. This is true for both the sharp corners of Fig. 3 and the rounded corners of Fig. 4.

I have discovered that it facilitates the adjustment for different shapes of saw teeth, and gives a better tooth shape in the different positions of adjustment, if the holes 41 in the swage block 20 are so located that the center 22 about which the swage block 20 is adjusted—that is, the center of the cylindrical portion 21 of the swage block—lies outside of the arc 55 on which the working corner 54 of the die moves, but does so by a distance which is small as compared with the radius of such arc 55. Preferably, the parts are so arranged that the beveled working face 30 of the anvil 25 also lies slightly below the center 22. By this arrangement, the working space between the working corner 54 of the die and working face 30 of the anvil moves circumferentially about and slightly below the center 22 when the swage block is adjusted within the annular portion 11 of the frame.

In operation, the swage is set on the saw so that the saw projects into the slot 32, the guide bars 15 and 16 coöperate properly with the tops of the saw teeth, and one of the saw teeth (the one to be swaged) projects into the space between the lower beveled working face 30 of the anvil 25 and that portion of the cylindrical surface 51 of the die which lies adjacent the working corner 54. At this time, the operating lever 43 is swung as far as possible to the right (Fig. 1), so as to make this tooth-receiving space the maximum. The swinging of the operating lever 43 is limited in the opening and closing directions by adjustable stops 57 and 58 mounted in arc-shaped slots 59 in upwardly projecting flanges of the frame 10. If necessary, the various adjustable parts are now adjusted to make the swage suit the particular saw being operated on. Then, with the tooth to be swaged in the working space, the clamping lever 36 is operated to clamp the saw 12 in proper position between the screws 33 and 34. Then the operating lever 43 is swung to the left (Fig. 1). This causes that portion of the cylindrical surface 51 of the die which is near the working corner 54 to move upwardly toward the working face 30 of the anvil, for every point on the surface of the die moves in an arc about the center 44 as the operating lever 43 is operated. This causes the working portion of the die to compress between it and the working face 30 of the anvil that portion of the saw tooth which lies in the working space between them. In this operation, only the working corner 54 and that part of the adjacent cylindrical surface 51 which is near it operates on the saw tooth. The other corners 54 do not touch the saw tooth, for reasons already explained. When the operating lever 43 has been swung sufficiently to the left, to produce the required swaging, it is returned to the right and the clamping lever 36 is released, and the device is moved forward to the next saw tooth, whereupon the operation is repeated. This is continued rapidly and accurately, until the entire saw is swaged.

The die with the sharp working corners shown in Fig. 3 is preferable for some classes of work, particularly for new cut teeth; but for other classes of work, and particularly for saws which have seen considerable use and whose teeth have already been swaged many times, the die with the rounded working corners shown in Fig. 4 is preferable. In the sharp cornered die of Fig. 3, the movement of the swaging surface toward the arc 55 and the consequent pushing back of the metal of the saw tooth are not greatly different per unit of angular movement for different parts of the swaging operation; but with the round corner die of Fig. 4 the movement of the active swaging surface toward the arc 55 per unit of angular movement decreases greatly as the successive points of the swaging surface come into action on the saw tooth, so that the pushing back of the metal of the saw tooth is greatest at first and rapidly diminishes as the swaging operation continues, thus making the final pull, when the tooth point is spread most greatly and the pushing back of the metal is hardest, the point of smallest lift or pushing back of the metal, and both facilitating the swaging operation and making a smoother swage curve.

I claim as my invention:

1. A saw swage, comprising a swage block, an anvil mounted in said swage block to bear against the back of a saw tooth, a die arranged to act on the front face of the saw tooth to compress the latter between the die and the anvil, the working portion of said die being symmetrical about major and minor axes to provide four working portions any one of which may be brought into working position, and being mounted for rotation in said swage block about a center which is spaced from both said major and minor axes and lies in that one of the quadrants formed by said axes which is opposite the one containing the working corner.

2. A saw swage, comprising a swage block, an anvil mounted in said swage block to bear against the back of a saw tooth, a die arranged to act on the front face of the saw tooth to compress the latter between the die and the anvil, said die comprising a straight bar of uniform cross section which is symmetrical about major and minor axes to provide four working portions any one of which may be brought into working position, and bushings mounted for rotation in said swage block and having through them alined longitudinal holes in which said die fits, the die-receiving hole being arranged in said bushings so that the center of rotation of the bushings and die is displaced from said major axis.

3. A saw swage, comprising a swage block, an anvil mounted in said swage block to bear against the back of a saw tooth, a die arranged to act on the front face of the saw tooth to compress the latter between the die and the anvil, said die comprising a straight bar of uniform cross section which is symmetrical about major and minor axes to provide four working portions any one of which may be brought into working position, and bushings mounted for rotation in said swage block and having through them alined longitudinal holes in which said die fits and is longitudinally adjustable, the die-receiving hole being arranged in said bushings so that the center of rotation of the bushings and die is displaced from said major axis.

4. A saw swage, comprising a swage block, an anvil mounted in said swage block to bear against the back of a saw tooth, a die arranged to act on the front face of the saw tooth to compress the latter between the die and the anvil, said die comprising a straight bar of uniform cross section which is symmetrical about major and minor axes to provide four working portions any one of which may be brought into working position, and bushings mounted for rotation in said swage block and having through them alined longitudinal holes in which said die fits, the die-receiving hole being arranged in said bushings so that the center of rotation of the bushings and die is displaced from both said major and said minor axes.

5. A saw swage, comprising a swage block, an anvil mounted in said swage block to bear against the back of a saw tooth, a die arranged to act on the front face of the saw tooth to compress the latter between the die and the anvil, said die comprising a straight bar of uniform cross section which is symmetrical about major and minor axes to provide four working portions any one of which may be brought into working position, and bushings mounted for rotation in said swage block and having through them alined longitudinal holes in which said die fits and is longitudinally adjustable, the die-receiving hole being arranged in said bushings so that the center of rotation of the bushings and die is displaced from both said major and said minor axes.

6. A saw swage, comprising a swage block, an anvil mounted in said swage block to bear against the back of a saw tooth, a die arranged to act on the front face of the saw tooth to compress the latter between the die and the anvil, said die comprising a straight bar of uniform cross section which is symmetrical about major and minor axes to provide four working portions any one of which may be brought into working position, and bushings mounted for rotation in said swage block and having through them alined longitudinal holes in which said die fits, the die-receiving hole being arranged in said bushings so that the center of rotation of the bushings and die is displaced from both said major and said minor axes and lies in that one of the quadrants formed by said axis which is opposite the one in which the working portion of the die lies.

7. A saw swage, comprising a swage block, an anvil mounted in said swage block to bear against the back of a saw tooth, a die arranged to act on the front face of the saw tooth to compress the latter between the die and the anvil, said die comprising a straight bar of uniform cross section which is symmetrical about major and minor axes to provide four working portions any one of which may be brought into working position, and bushings mounted for rotation in said swage block and having through them alined longitudinal holes in which said die fits and is longitudinally adjustable, the die-receiving hole being arranged in said bushings so that the center of rotation of the bushings and die is displaced from both said major and said minor axes and lies in that one of the quadrants formed by said axis which is opposite the one in which the working portion of the die lies.

8. A saw swage, comprising a swage block, an anvil mounted in said swage block to bear against the back of a saw tooth, a die arranged to act on the front face of the saw tooth to compress the latter between the die and the anvil, said die comprising a straight bar of uniform cross section, the surface of said bar being formed of two opposite surfaces at the opposite ends of a major axis and two opposite cylindrical surfaces at the opposite ends of a minor axis of the cross section of said bar and both coöperating with both said first-named surfaces to form four working corners which are the points on the surface of said die of maximum distance from the intersection of said two axes, and bushings rotatably mounted in said swage block and being provided with alined holes in which said die fits, the center of rotation of said bushings and die being displaced from both said major and minor axes.

9. A saw swage, comprising a swage block, an anvil mounted in said swage block to bear against the back of a saw tooth, a die arranged to act on the front face of the saw tooth to compress the latter between the die and the anvil, said die comprising a straight bar of uniform cross section, the surface of said bar being formed of two opposite plane surfaces at the opposite ends of a major axis and two opposite cylindrical surfaces at the opposite ends of a minor axis of the cross section of said bar and both coöperating with both said first-named surfaces to form four working corners which are the points of the surface of said die of maximum distance from the intersection of said two axes, and bushings rotatably mounted in said swage block and being provided with alined holes in which said die fits, the center of rotation of said bushings and die being displaced from both said major and minor axes.

10. A saw swage, comprising a swage block, an anvil mounted in said swage block to bear against the back of a saw tooth, a die arranged to act on the front face of the saw tooth to compress the latter between the die and the anvil, said die comprising a straight bar of uniform cross section, the surface of said bar being formed of two opposite surfaces at the opposite ends of a major axis and two opposite cylindrical surfaces at the opposite ends of a minor axis of the cross section of said bar and both coöperating with both said first-named surfaces to form four working corners which are the points on the surface of said die of maximum distance from the intersection of said two axes, and bushings rotatably mounted in said swage block and being provided with alined holes in which said die fits and is longitudinally adjustable, the center of rotation of said bushings and die being displaced from both said major and minor axes.

11. A saw swage, comprising a swage block, an anvil mounted in said swage block to bear against the back of a saw tooth, a die arranged to act on the front face of the saw tooth to compress the latter between the die and the anvil, said die comprising a straight bar of uniform cross section, the surface of said bar being formed of two opposite plane surfaces at the opposite ends of a major axis and two opposite cylindrical surfaces at the opposite ends of a minor axis of the cross section of said bar and both coöperating with both said first-named surfaces to form four working corners which are the points on the surface of said die of maximum distance from the intersection of said two axes, and bushings rotatably mounted in said swage block and being provided with alined holes in which said die fits and is longitudinally adjustable, the center of rotation of said bushings and die being displaced from both said major and minor axes.

12. A saw swage, comprising a swage block, an anvil mounted in said swage block to bear against the back of a saw tooth, a die arranged to act on the front face of the saw tooth to compress the latter between the die and the anvil, said die being rotatably mounted in said swage block, a frame in which said swage block is circumferentially adjustable, the center of adjustment of said swage block lying outside the arc of travel of any point on the working surface of the die and outside the working space between the die and anvil but spaced therefrom by a distance which is small as compared with the radius of rotation of the working part of the die.

13. A saw swage, comprising a swage block, an anvil mounted in said swage block to bear against the back of a saw tooth, a die arranged to act on the front face of the saw tooth to compress the latter between the die and outside the working space between mounted in said swage block, a frame in which said swage block is circumferentially adjustable, the center of adjustment of said swage block lying outside the arc of travel of any point on the working surface of the die but spaced therefrom by a distance which is small as compared with the radius of rotation of the working part of the die.

In witness whereof I, JOHN F. PRIBNOW, have hereunto set my hand at Sheboygan, Wisconsin, this 17th day of June, A. D., one thousand nine hundred and eighteen.

JOHN F. PRIBNOW.

Copies of this patent may be obtained for five cents each, by addressing the "Commissioner of Patents, Washington, D. C."

Certificate of Correction.

It is hereby certified that in Letters Patent No. 1,284,141, granted November 5, 1918, upon the application of John F. Pribnow, of Mellen, Wisconsin, for an improvement in "Saw Swages," an error appears in the printed specification requiring correction as follows: Page 5, line 48, claim 13, strike out the words " outside the working space between " and insert instead *the anvil, said die being rotatably;* and that the said Letters Patent should be read with this correction therein that the same may conform to the record of the case in the Patent Office.

Signed and sealed this 11th day of November, A. D. 1924.

[SEAL.]
KARL FENNING,
*Acting Commissioner of Patents.*